United States Patent
Guidry

[19]

[11] Patent Number: 5,878,739
[45] Date of Patent: Mar. 9, 1999

[54] COMBINATION GAS AND CHARCOAL GRILL

[75] Inventor: Gregg A. Guidry, Lafayette, La.

[73] Assignee: Percy Guidry, Inc., Lafayette, La.

[21] Appl. No.: 796,717

[22] Filed: Feb. 6, 1997

[51] Int. Cl.$^6$ .............................. A47J 37/00; F24C 3/00
[52] U.S. Cl. .................. 126/25 R; 126/25 A; 126/41 R; 99/447; 99/401
[58] Field of Search ................. 126/25 R, 25 A, 126/25 B, 41 R, 41 E, 41 A, 50; 99/447, 446, 443, 421 HV, 401

[56] References Cited

U.S. PATENT DOCUMENTS

| | | | |
|---|---|---|---|
| 1,010,169 | 11/1911 | Noreck | 126/41 E |
| 2,355,230 | 8/1944 | Moecker, Jr. et al. | 126/41 E |
| 3,871,355 | 3/1975 | Henry | 126/92 R |
| 4,561,418 | 12/1985 | Cairns . | |
| 4,572,062 | 2/1986 | Widdowson . | |
| 4,592,335 | 6/1986 | Beller . | |
| 4,627,413 | 12/1986 | Watson . | |
| 4,643,162 | 2/1987 | Collins | 126/41 R |
| 4,658,710 | 4/1987 | Quet et al. . | |
| 4,724,753 | 2/1988 | Neyman et al. . | |
| 4,788,962 | 12/1988 | Mashburn et al. . | |
| 4,819,614 | 4/1989 | Hitch . | |
| 4,852,476 | 8/1989 | Sanchez | 126/25 A |
| 4,854,297 | 8/1989 | Shuman . | |
| 4,944,282 | 7/1990 | Aguiar et al. . | |
| 5,099,821 | 3/1992 | Ceravolo . | |
| 5,213,075 | 5/1993 | Stephen et al. . | |
| 5,253,634 | 10/1993 | LeBeouf . | |
| 5,291,875 | 3/1994 | Koziol . | |
| 5,404,798 | 4/1995 | Omarini . | |
| 5,447,096 | 9/1995 | Bürge et al. . | |
| 5,458,053 | 10/1995 | Hsiao . | |
| 5,473,980 | 12/1995 | Carpenter | 126/25 R |

*Primary Examiner*—James C. Yeung
*Attorney, Agent, or Firm*—Blank Rome Comisky & McCauley LLP

[57] ABSTRACT

A combined gas and charcoal grill having an adjustable height burner. A combined gas and charcoal grill are provided in which the burner element is pivotably mounted within the grill enclosure so as to permit location adjustment of the burner relative to the grid which supports the food to be cooked. The burner element is configured along with a charcoal tray to form a burner/tray assembly which is vertically movable. Flame height from the burner is also adjustable independent of burner location. A deflector shield is provided to prevent grease and food debris from coming into contact with the burner itself. A removable tray also permits the use of water for steaming and wood chips for smoking. A self-cleaning feature is also provided.

24 Claims, 4 Drawing Sheets

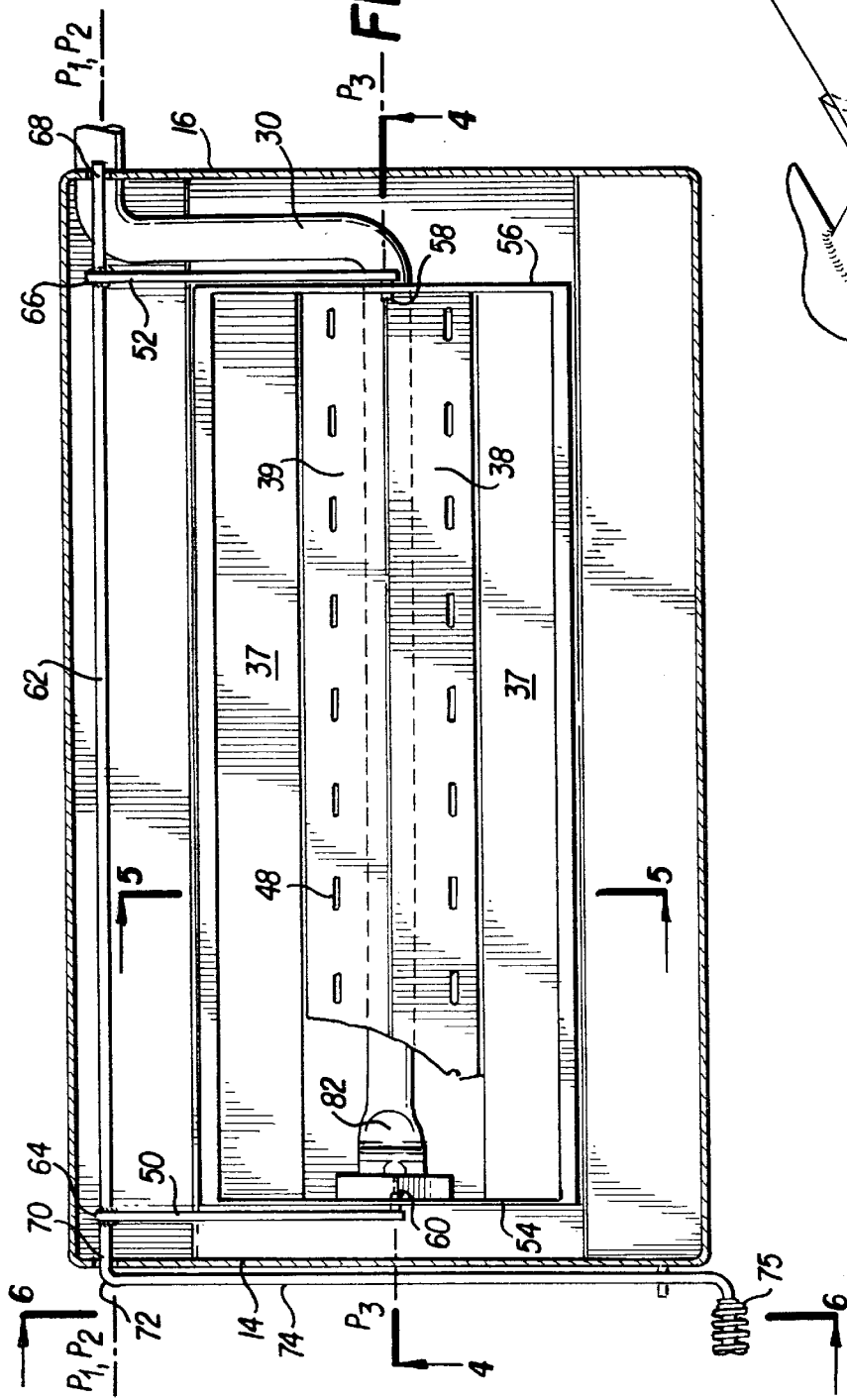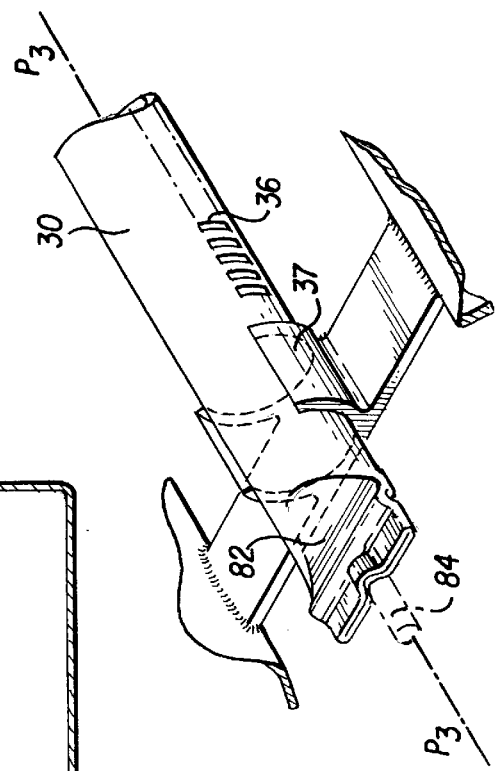

COMBINATION GAS AND CHARCOAL GRILL

FIELD OF THE INVENTION

The present invention generally relates to grills which may be used both outdoors and indoors. More particularly, the present invention relates to a cooking appliance which can be functional with gas or charcoal as a source of fuel, or a combination of both fuels operating at the same time.

Moreover, the present invention includes the capacity to raise and lower a pivotably adjustable gas-fired burner and coal tray to completely control the cooking temperature.

BACKGROUND OF THE INVENTION

The prior art illustrates various types of outdoor grills which use charcoal in combination with gas as the source of fuel.

It is known in the art that one may place the food being grilled at a desired position from the source of the fuel. Thus, U.S. Pat. No. 4,572,062 discloses a firebox moveable in a vertical direction, but useful only with charcoal. U.S. Pat. No. 5,291,875 discloses an adjustable gas venturi assembly which is fabricated to fit numerous types of barbecue grills, and to provide communication between the gas supply and the burner element. U.S. Pat. No. 5,253,634 discloses a grilling apparatus having a vertically movable coal tray. U.S. Pat. No. 5,504,798 discloses an apparatus for cooking foods wherein a drip-pan is moveable to variable heights, but the heat source is in a stationary position.

U.S. Pat. Nos. 5,458,063; 5,099,821; 4,854,297; 4,944,282; 4,592,335 and 4,627,415 disclose different types of grills with moveable cooking grids and/or stationary burners. However, most of the gas grills have the disadvantage of stationary burners which are located directly below the cooking grid, and are subject to uncontrollable grease fires and limit the consumer to only high temperature grilling. Similarly, grill apparatus using an adjustable coal tray which is vertically moveable during the grilling process results in similar problems of intense heat and uncontrollable grease fires.

Therefore, it would be desirable to provide a grilling apparatus that avoids the aforementioned disadvantages of the prior art devices, yet provides a grilling apparatus comprising a pivotally adjustable burner.

SUMMARY OF THE INVENTION

The present invention is directed to a grilling apparatus and in particular to a grilling apparatus that has an adjustable burner, especially one that is pivotable around the jet/orifice of the valve leading to the propane gas tank. An important advantage of the present invention is the fact that an adjustable gas-fired burner and a coal tray can be manually operated by the user so as to raise and lower each. In addition, the gas burner has an adjustable gas valve to adjust flame height to three levels—high, medium and low, as well as off. The combination of height adjustment of the gas burner/charcoal tray and gas valve adjustment allows total control of the cooking temperature. Another feature is a burner deflector which not only protects the burner from grease and food debris, but also acts as flame tamer to extinguish flare-ups on the order of several seconds.

A further advantageous feature of the present invention is a stainless steel deflector pan which can be operated to suppress the source of the heat by placing the pan on top of the gas burner/coal tray. At the same time, it functions as a grease catcher and completely eliminates flare-ups because the grease never comes in direct contact with the flame of the burner. Therefore, the grease and food debris never actually ignite. As the charcoal burns and turns into ash, it naturally falls, with the help of gravity, into a removable ash pan located at the very bottom of the grill. As a result, the grilling apparatus is self-cleaning.

Yet another advantage of the present invention is to provide a gas burner which is positioned within a charcoal tray in which the gas burner can be used as a lighter for charcoal or to provide sufficient heat to operate as a gas grill with the gas burner deflector and empty coal tray.

In summary, the present invention, while incorporating the features described above, will combine a new gas/charcoal grilling apparatus which will operate as an "all in one" grill having the functions of: operating as a quick lighting charcoal grill with a gas burner igniting the charcoal; operating as a gas grill with simply the burner deflector above the gas burner and the gas burner turned on; operating as a combination gas and charcoal grill to achieve maximum temperatures over 900° F. for searing steaks, etc.; operating as a steamer with the stainless steel deflector pan filled with water with either gas or charcoal; operating as a charcoal/gas griller with the gas burner level on high and the gas burner/charcoal tray lifted up in the high position with or without charcoal and with only the burner deflector; operating as a smoker with fresh cut wood chunks in the charcoal tray, the stainless steel pan on top of tray filled with water, gas burner level on low and tray positioned dropped down to the low level.

With the foregoing and other advantages, and features of the invention that will become hereinafter apparent, the nature of the invention may be more clearly understood by reference to the following detailed description of the invention and several views illustrated in the drawings.

BRIEF DESCRIPTION OF THE DRAWINGS

FIG. 3 is a top view of the burner unit;

FIG. 8 is a perspective view of an alternative burner tube yoke.

DETAILED DESCRIPTION OF THE INVENTION

Figure 1:
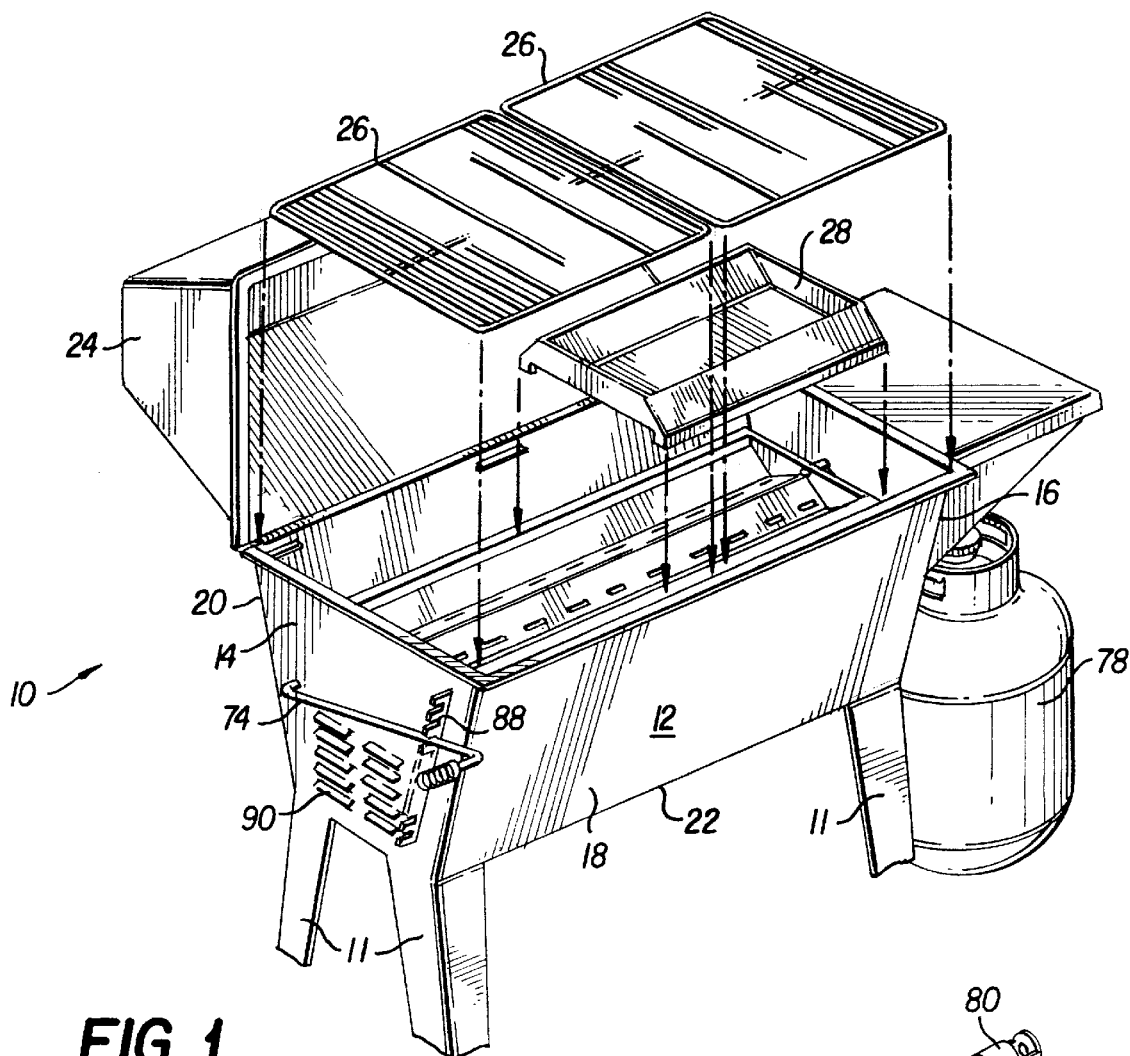
FIG. 1 is an overall perspective view of a grill in accordance with the present invention.
Figure 2:
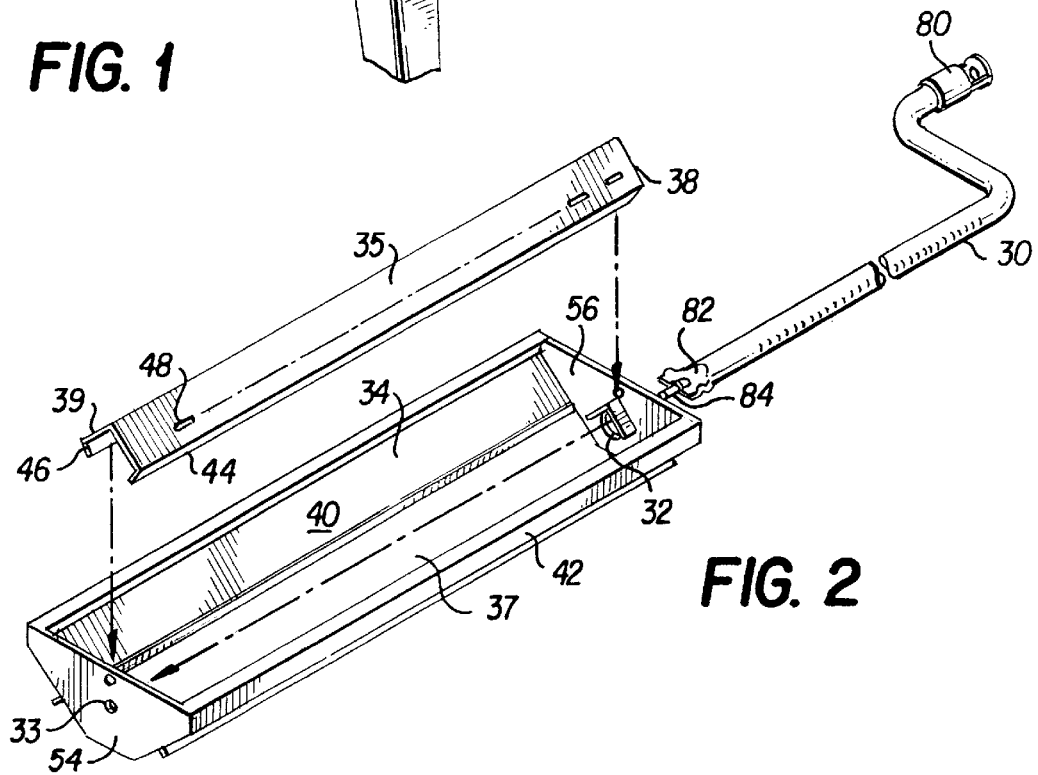
FIG. 2 is an exploded perspective of the burner unit in accordance with the present invention.
Figure 4:
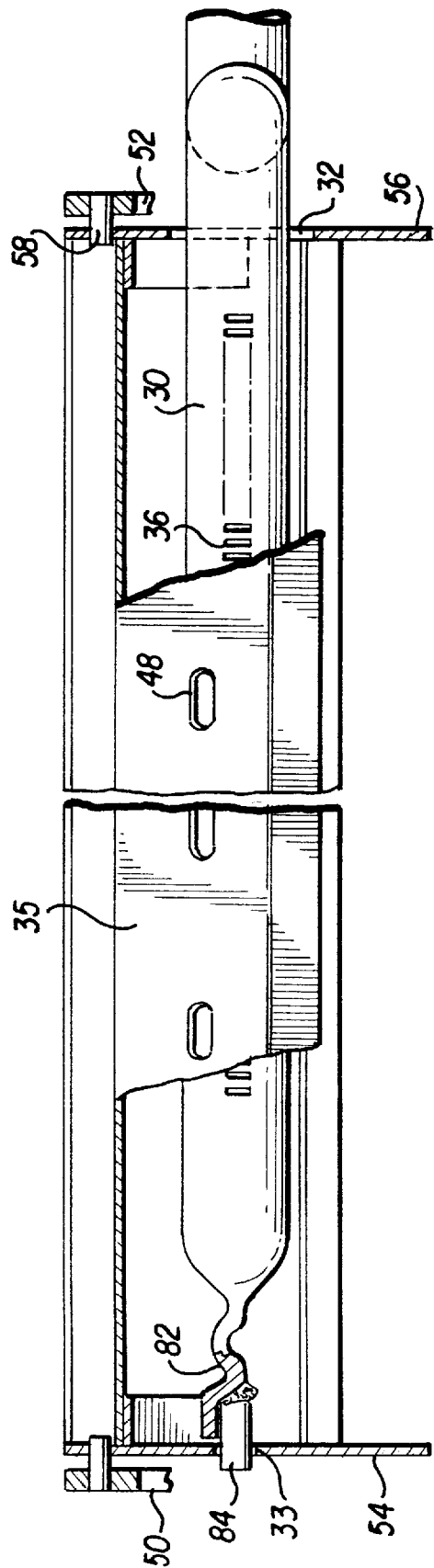
FIG. 4 is a side view of the burner unit;.

Referring now in detail to the drawings, wherein like parts are designated by like reference numbers throughout, there is illustrated in FIG. 1 a grilling apparatus which is designated generally by reference numeral 10. The grilling apparatus 10 comprises a grilling body portion 12 in the form of container of a generally rectangular shape with a pair of vertical side walls 14, 16 and a sloping front wall 18 and a sloping rear wall 20. The grilling body portion 12 has a base portion 22 supported by legs 11 and a moveable upper cover 24, which is hingedly engaged to rear wall 20 so that the cover 24 may be moveable between an open to a closed position. The grilling body portion 12 and cover 24 form an enclosure for holding in heat, smoke and steam, as desired. The grilling apparatus also includes a food supporting grill 26 made in the form of rectangular open grid and a stainless steel deflector pan 28 which can be filled either with water or charcoal, and when filled with water can operate as a steamer. Referring to FIGS. 2 and 3, the grilling apparatus 10 has an adjustable gas burner 30 which extends through an opening 32 in a charcoal tray 34. A rod or pin 84 is attached, as by welding, to the distal end of burner 30 and passes through a hole 33 in charcoal tray 34. Alternatively, as shown in FIG. 8, the distal end of burner 30 can be supported by a yoke or saddle 37 so as to permit rotation of burner 30. The gas burner 30 is made of a tube, having a configuration having two right angles and also having a plurality of openings 36 along its length as illustrated in FIG. 8. Burner 30 is positioned in charcoal tray 34 so as to permit burner 30 to be used as a lighter for charcoal placed in tray 34.

A burner deflector 35 is removably positioned over the top portion of the gas burner 30 and serves to protect the burner 30 from grease and food debris falling from grill 26. Moreover, the burner deflector 35 (shown in FIG. 2) acts as flame tamer to extinguish flare-ups.

The burner deflector 35 comprises two stainless steel plates 38, 39 that are essentially perpendicular to each other. Each of the stainless steel plates 38, 39 has extensions 44, 46 which are respectively parallel to sloping side walls 42, 40 of the charcoal tray 34 as illustrated in FIG. 2. A plurality of elongated openings 48 are located along the length of the steel plates 38, 39 to permit the user to adjust the desired temperature during the cooking process by adjusting the flame height coming from burner 30.

Figure 6:
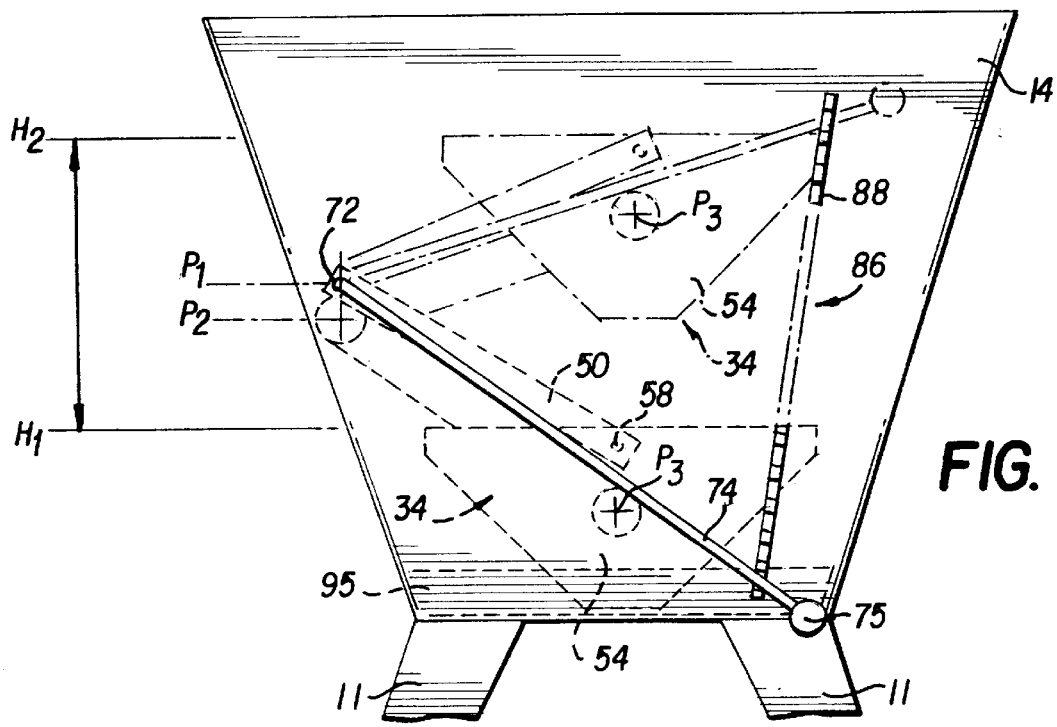
FIG. 6 is an end view of the grill showing a burner height adjustment.

As illustrated in the figures, particularly in FIGS. 1, 3, 6 and 7, there is included the gas burner 30 and charcoal tray 34 cooperate to permit vertical adjustment of the height of coal tray 34 together with burner 30 between a lowest position $H_1$ to a highest position $H_2$. As shown in FIGS. 3 and 6, the movement of gas/charcoal tray unit further comprise a pair of arms 50, 52 at each side wall 54, 56 of the coal tray 34. Each of the arms 50, 52 are hingedly attached through the pins 58, 60 to the charcoal tray 34, and from the other side fixedly attached via welding or the like to pivoting rod 62, at points 64 and 66. One end 68 of the pivoting rod 62 rotates within the sidewall 16 of grilling apparatus 10 and the other end 70 extends through the sidewall 14 of the grill 10 and may form an elbow turn at 72 to form a handle 74 having knob 75 (FIG. 6) moveable along the exterior sidewall 14.

Referring now to FIGS. 3, 4, 7 and 8, there is shown an adjustable gas burner 30—one open end 80 of which is pivotably or rotatably connected to a jet/orifice unit 81 to provide connection through a gas control feed line 76 with a gas supply tank 78 (FIG. 1). The other end 82 of the gas burner 30 is closed and is housed inside the charcoal tray 34 and rotatably attached via pin 84 to the sidewall 54 of tray 34 through hole 33.

Referring specifically to FIGS. 3 and 6, it is seen that the handle 74 would force the pivoting rod 62 to rotate about pivot axis $P_1$ (FIG. 6) within the body portion 12 thereby to rotate burner 30 about pivot axes $P_2$ and $P_3$ (FIG. 6) and thereby move the combined charcoal tray 34 with angled tube burner 30 from its lowest position $H_1$ to its highest position $H_2$ or vice versa, depending on the rotation of the handle 74. With reference to FIGS. 1 and 6, specifically, it is seen that a height adjustment plate 86 with a plurality of notched holes 88 is mounted perpendicular to the side wall 14 to provide height adjustment engagement of the handle 74 during its upward and downward travel and to provide the desired height of the gas burner/charcoal tray unit. At the same time, the combined burner and tray assembly are kept level at each chosen height. A pair of louvered vents 90 is provided at each end of grilling body portion 12 on walls 14, 16 to direct air to the charcoal during the grilling process. Alternatively, a pair of rotatable adjustable air flow ports (not shown) can be provided to direct air to the charcoal during the grilling process. The grilling apparatus 10 is also provided with an adjustable gas valve (not shown) to adjust flame height up to three settings (high, medium and low), as well as off. The combination of height adjustment of the gas burner/charcoal tray unit and gas valve adjustment allows total control of the cooking temperature.

Figure 5:
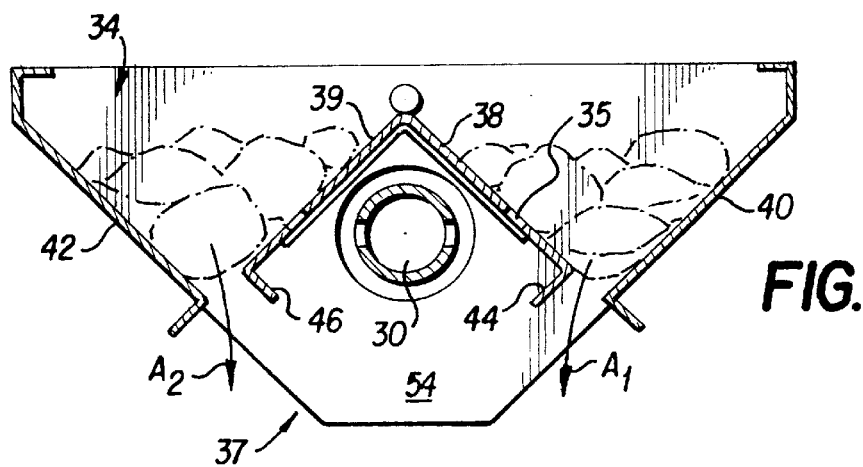
FIG. 5 is a vertical cross-sectional view of the burner unit taken substantially on the view line 5—5 of FIG. 3.
Figure 7:
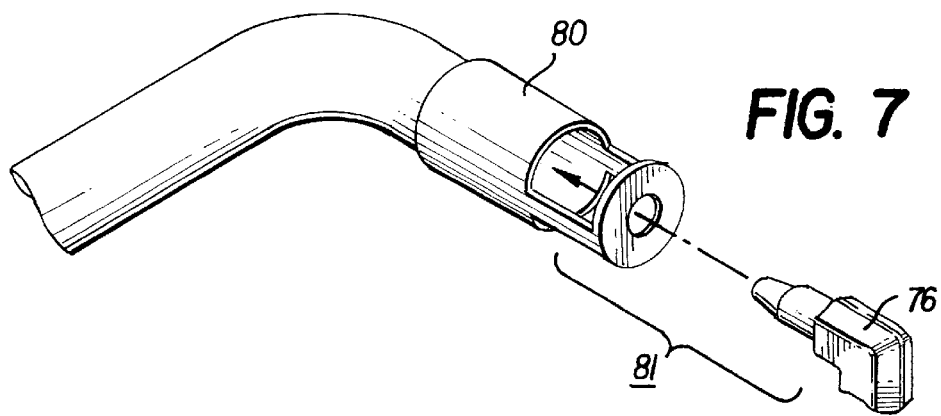
FIG. 7 is a perspective view showing a burner tube connection.

As shown in FIGS. 5 and 6, the grill apparatus includes a self-cleaning feature. Charcoal tray 34 has a hole 37 in the bottom thereof. As shown in FIG. 5, burner deflector 35 is positioned over burner 30 within tray 34 so as to provide support for charcoal briquettes. The spacing between tray walls 40 and 42 and deflector walls 38 and 39, respectively, provide a gap for ashes to fall through hole 37 to ash removal tray 95 positioned below tray 34, along ash flow paths $A_1$, $A_2$. Ash removal tray 95 is shaped like a drawer and can be slidably inserted into and removed from the bottom of grilling body 12 through vertical side wall 16. As a result, ashes and debris falling from tray 34 or grill 26 are readily caught in tray 95 and easily removed.

Although a presently preferred embodiment of the invention has been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. A grilling apparatus comprising:
   an openable enclosure, having a food support member therein, and
   a burner element pivotably connected to a gas source and movable within said enclosure and having an inlet for receiving a combustible gas, said pivotable movement permitting vertical adjustment of said burner element relative to said food support member;
   a charcoal tray in which said pivotable burner element is disposed so as to form a combined burner and tray assembly; and
   a deflector shield removably positioned in said charcoal tray above said burner element for shielding said burner element.

2. A grilling apparatus as in claim 1, wherein said deflector shield assists said tray in supporting charcoal coals and shields said burner element from the charcoal coals.

3. A grilling apparatus as in claim 1, further comprising a removable tray positionable above said burner element and below said food support member, said tray configured to hold materials selected from the group of materials consisting of water, wood chips and charcoal.

4. A grilling apparatus as in claim 1, wherein the flame height of said burner element is adjustable independent of the location of said burner element relative to said food support member.

5. A grilling apparatus as in claim 1, further comprising an ash and debris holder positioned at the bottom of said enclosure below said burner element so as to permit removal of ashes and debris from said grilling apparatus.

6. A grilling apparatus as in claim 1, wherein said enclosure includes a cover hingedly attached to a lower enclosure member, thereby permitting said enclosure to be opened and closed.

7. A grilling apparatus as in claim 1, wherein said combined burner and tray assembly are adjustable in position below said food support member while remaining level throughout said adjustment.

8. A grilling apparatus as in claim 1, wherein said enclosure includes at least one air inlet port.

9. A grilling apparatus as in claim 1, wherein said enclosure includes a support externally mounted to said enclosure for supporting a combustible gas fuel supply tank.

10. A grilling apparatus as in claim 1, wherein said burner element includes a plurality of holes along the length of said burner element.

11. A grilling apparatus as in claim 1, wherein said burner element is configured as a tube having two right angle bends, thereby permitting pivotable movement about a pivot axis located near a gas jet from a combustible gas fuel supply.

12. A grilling apparatus as in claim 1, wherein said deflector shield includes a plurality of holes along the length thereof so as to permit flame from said burner element to pass therethrough.

13. A grilling apparatus as in claim 1, wherein said charcoal tray includes a hole therein for communicating with an ash and debris holder which is removable and communicates with said enclosure so as to permit said grilling apparatus to be self-cleaning.

14. A grilling apparatus comprising:
   an operable enclosure, having a food support member therein, and
   a combined gas burner and charcoal tray assembly mounted within said enclosure, said assembly having a gas burner element having an inlet for receiving a combustible gas, said burner element pivotably connected to a gas source and movable about a pivot axis located at said inlet, said pivotable movement permitting vertical adjustment of said assembly relative to said food support member; and
   a deflector shield removably positioned between said burner element and said food support member, said deflector shield including a plurality of holes along the length thereof so as to permit flame from said burner element to pass there through.

15. A grilling apparatus as in claim 14, further comprising a removable tray positionable above said burner element and below said food support member, said tray configured to hold materials selected from the group of materials consisting of water, wood chips and charcoal.

16. A grilling apparatus as in claim 14, wherein the flame height of said burner element is adjustable independent of the location of said burner element relative to said food support member.

17. A grilling apparatus as in claim 14, further comprising an ash and debris holder positioned at the bottom of said enclosure below said burner element so as to permit removal of ashes and debris from said grilling apparatus.

18. A grilling apparatus as in claim 17, wherein said combined gas burner and charcoal tray assembly includes a hole therein for communicating with an ash and debris holder which is removable and communicates with said enclosure so as to permit said grilling apparatus to be self-cleaning.

19. A grilling apparatus as in claim 14, wherein said enclosure includes a cover hingedly attached to a lower enclosure member, thereby permitting said enclosure to be opened and closed.

20. A grilling apparatus as in claim 14, wherein said combined burner and tray assembly are adjustable in position below said food support member while remaining level throughout said adjustment.

21. A grilling apparatus as in claim 14, wherein said enclosure includes at least one air inlet port.

22. A grilling apparatus as in claim 14, wherein said enclosure includes a support externally mounted to said enclosure for supporting a combustible gas fuel supply tank.

23. A grilling apparatus as in claim 14, wherein said burner element includes a plurality of holes along the length of said burner elements.

24. A grilling apparatus as in claim 14, wherein said burner element is configured as a tube having two right angle bends, thereby permitting pivotable movement about a pivot axis located near a gas jet from a combustible gas fuel supply.

* * * * *